Sept. 30, 1958 C. J. DANIELS ET AL 2,854,644

ELECTRICAL COMPONENT AND METHOD OF MAKING

Filed Jan. 29, 1953 4 Sheets-Sheet 1

INVENTORS
CHARLES J. DANIELS,
JOHN W. DANIELS

BY Ostrolenk & Faber

ATTORNEYS

Sept. 30, 1958 C. J. DANIELS ET AL 2,854,644

ELECTRICAL COMPONENT AND METHOD OF MAKING

Filed Jan. 29, 1953 4 Sheets-Sheet 2

INVENTORS
CHARLES J. DANIELS
JOHN W. DANIELS

BY Ostrolenk & Faber
ATTORNEYS after photo-etching after plating after piercing

INVENTORS
CHARLES J. DANIELS
JOHN W. DANIELS

BY

Ostrolenk & Faber

ATTORNEYS

ELECTRICAL COMPONENT AND METHOD OF MAKING

Filed Jan. 29, 1953 4 Sheets-Sheet 4

INVENTORS
CHARLES J. DANIELS
JOHN W. DANIELS
BY
Ostrolenk & Faber
ATTORNEYS

United States Patent Office 2,854,644

Patented Sept. 30, 1958

2,854,644

ELECTRICAL COMPONENT AND METHOD OF MAKING

Charles J. Daniels, Los Angeles, and John W. Daniels, Alhambra, Calif.; said John W. Daniels assignor, by mesne assignments, to Standard Coil Products Co. Inc., a corporation of Illinois Original application November 3, 1950, Serial No. 193,989. Divided and this application January 29, 1953, Serial No. 334,058

4 Claims. (Cl. 333—82)

This application is a division of our application Serial No. 193,989 filed November 3, 1950, now Patent No. 2,762,113 and pertains to the manufacture of electronic components and particularly to improvements in the manufacture of components of the "printed" type whereby such parts can be produced rapidly, economically and with a precision heretofore unobtained in mass production.

A principal object of the invention is to provide novel circuit elements comprising conductive portions carried upon or functionally integral with dielectric or insulating plates, such conductive portions having predetermined and desired mechanical and electrical properties, the desired elements being reproducible rapidly and economically within narrow tolerances.

Another object of the invention is to provide a method for the manufacture of components of this type in multiple units which may be handled as single parts during a large portion of the time required for their manufacture whereby to simplify the handling and treating of these multiple units.

A further object of the present invention is to provide tunable electrical panels incorporating novel tuning transmission lines useful in circuitry such as television tuners.

In order fully to disclose our invention so that it may be understood and practiced by others, we will describe herein the manufacture of tunable transmission lines of the type utilized in a novel high frequency tuning unit described and claimed in the co-pending applications of Carlton Wasmansdorff, Serial No. 70,747, filed January 13, 1949, now Patent No. 2,734,175 and Serial No. 80,310, filed March 8, 1949, now Patent No. 2,627,579; both of these applications are owned by the assignee of the present invention.

In connection with the detailed description of the process, we shall refer to the accompanying drawings in which.

Figures 1, 2:
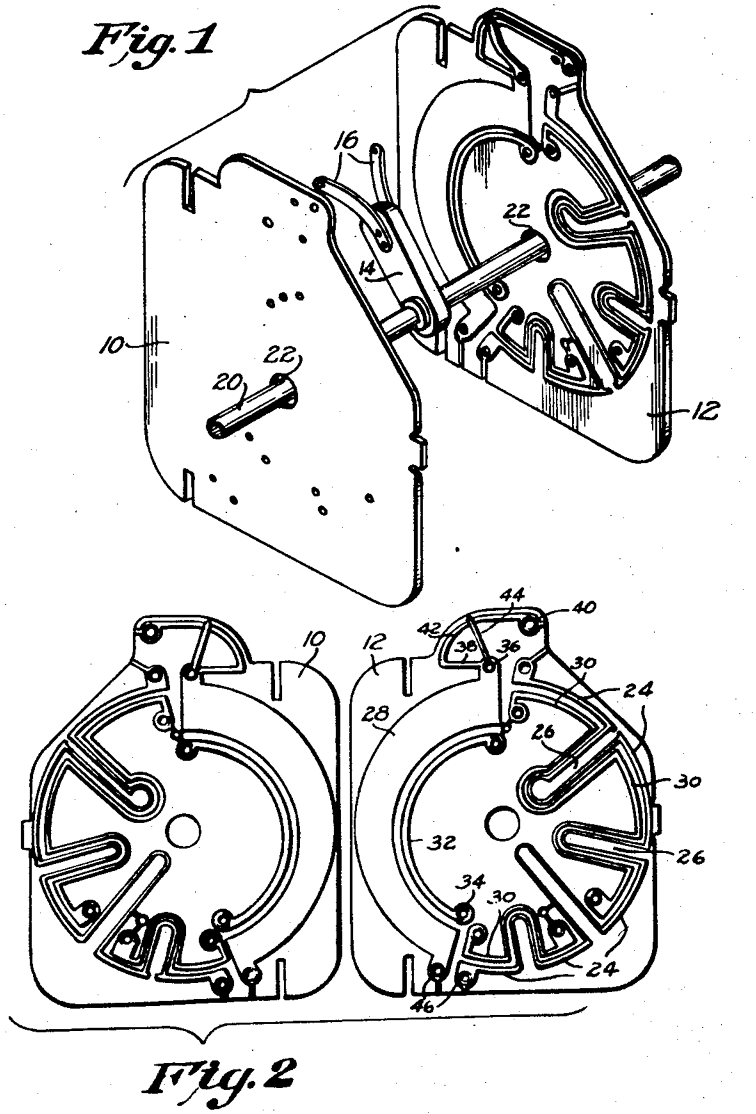
Figure 1 is an exploded view of a single tunable transmission line of the type whose manufacture is to be described.
Figure 2 is a plan view showing the two insulating plates of Figure 1 lying side by side as they would be if one of the plates of Figure 1 were turned over so as to be coplanar with the other.

Referring now to Figure 1 of the drawings, there is shown diagrammatically in exploded view a unit comprising one of the tunable transmission lines of the type shown in the above-mentioned co-pending applications. Such a unit comprises a pair of plates 10 and 12 which, as better illustrated in Figure 2, are enantiomorphically related as to their shape and the conductive patterns carried thereby.

In an actual assembly, the two plates 10 and 12 are secured in face-to-face relationship and about a half-inch apart so that their conductive areas may be bridged by a suitable contact element 14 carrying contact fingers 16 which are springy so as to ensure proper contact between these contact elements and the generally arcuate portions of the conductive areas of plates 10 and 12. This contact element 14 is fixed for rotation with (but insulated from) a shaft 20 which passes freely through apertures 22 in the plates. In an actual tuning unit, a plurality of sets of these transmission line elements are employed, the contact elements for the different sets being insulated from shaft 20 but secured thereto for ganged operation by said shaft.

Also, in a complete tuning unit utilizing several sets of these plates, the conductive patterns on plates of different sets will usually be somewhat different from one another in accordance with the particular requirements of the circuits to which they are in practice connected. However, for purposes of disclosure of the process of our invention, it will be sufficient to describe in detail the manufacture of one type of plate and the application of these principles to other elements and configurations will be obvious from such disclosure.

Referring now to the plate 12 shown at the right of Figure 2 of the drawings, it will be seen that the conductive pattern thereon includes arcuate portions 24 lying on a circle concentric with aperture 22, there being five of these portions 24 to make a total angular extent of about 180°. The adjacent ends of these arcuate portions are electrically connected by inductive loops 26 which extend inwardly toward the aperture 22. The remaining 180° of the circle is largely occupied by a single band 28 of conductive material whose outer edge is concentric with aperture 22 and whose inner edge, while generally arcuate, is eccentric to aperture 22 to provide a taper in the width in the portion 28 for a purpose clearly described in the above-mentioned application Serial No. 80,310.

Lying within the inner edge of each of the arcuate portions just described is a secondary pattern of conductive material. This secondary pattern lies within the arcuate portions 24 and comprises parallel arcuate portions 30, also connected between their respective ends by loops extended inwardly toward aperture 22, and in the case of strip 28 the secondary pattern is a continuous arc 32 paralleling the inner edge of said strip. Eyelets 34 are provided to terminate certain of the pattern areas just described to enable electrical connections to be made by soldering or the like.

In the case of the upper termination of strip 28, it will be observed that an outwardly extending tongue 36 is connected by a line 38 to an eyelet 40 and that a portion 42 of this line forms a quadrant of a circle having its center at the tongue 36. A rotatable spring contact finger 44 is pivoted at tongue 36 and arranged to rotate along line portion 42 so as to permit a fine adjustment of the effective electrical length of the strip 28.

In use, appropriate signal input connections are made to the inner strips such as 30 and 32, and the contact fingers 16 are adjusted by shaft 20 so as to contact different peripheral portions of the outer arcuate elements such as 24 and 28, all in accordance with principles set forth in the above-mentioned applications. Said applications also explain the reason for providing the substantially circular transmission line with external connections 46 at points about half way along the length (that is, near the bottoms of the plates shown in Figure 2).

Our invention is further concerned with the rapid, economical and accurate fabrication of the plates 10 carrying the conductive areas above described and to this end we utilize a refinement of a photo-etching process. In brief, the starting point of our process is a sheet of insulating material which may have a thickness of the order of .050 inch and which may, for example, be a rigid plastic material such as Bakelite. One surface of this sheet has applied thereto an all-over coating or lamination of a conductive material; for example, a thin sheet or foil of copper may be bonded to the insulating sheet by the use of an adhesive, hot pressing or the like. After application, the copper sheet (which may have a thickness of the order of .0015 inch) is cleaned thoroughly as by washing with powdered pumice and water and then coated with "cold top" enamel, such as is well-known in the photo-engraving art. Such an enamel, for example, may comprise a light-sensitive resist material such as bichromated gelatin which has the property of being hardened and rendered comparatively insoluble in water after exposure to light.

Figure 3:
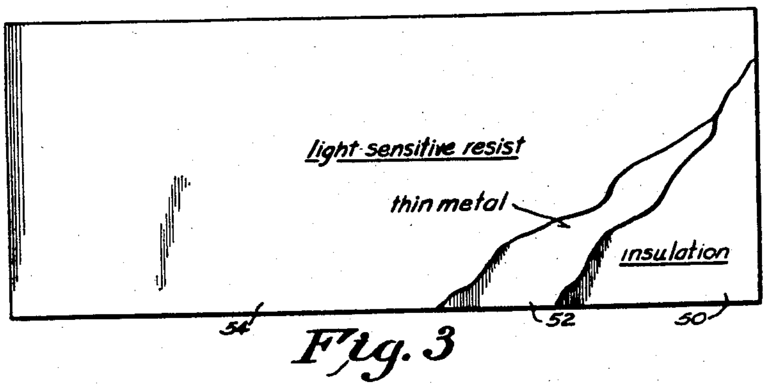
Figure 3 is a plan view of a sheet of insulating material bearing a coating of conductive material (partly broken away to show the laminar nature of the sheet).

Figure 3 of the drawings illustrates the composite sheet just described, and in that figure numeral 50 designates the insulating base sheet such as a high-grade paper base impregnated Bakelite sheet. Numeral 52 designates the thin overlay of copper and numeral 54 designates the coating of cold top enamel.

Figure 4:
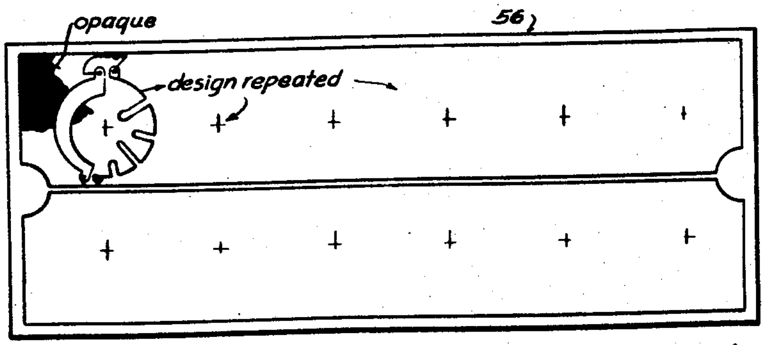
Figure 4 is a plan view of a master drawing representing the desired configuration of conductive material to be produced upon an insulating base.

In order to produce the described pattern of conductive material (herein copper) on the composite sheet, a master such as shown in Figure 4 is prepared. This master 56 may be an accurate drawing corresponding to the configuration of a plurality of plates 10. The areas representative of the conductive portions of the finished plate 10 are relatively transparent, while the remaining areas of the master are relatively opaque. Such a master may be obtained by making a photographic negative of an accurate ink drawing of the desired configuration or pattern and its preparation may utilize well-known photographic techniques such as enlargement or reduction from an original ink drawing. However, it is to be understood that the method of preparing master 56 is not a feature of the present invention.

Figure 5:
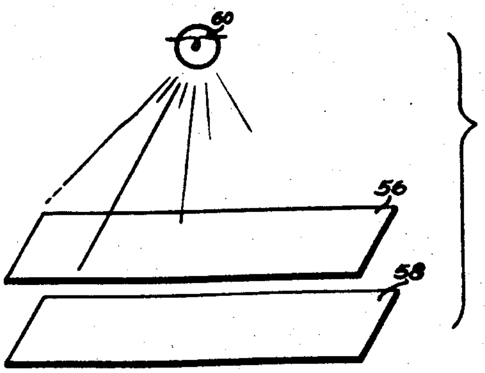
Figure 5 is a perspective view illustrating the method by which a plurality of images of the deisred shape are impressed upon the plate of Figure 3 by a photo-etch process.

As shown in Figure 4, for reasons of economy, the master may carry a plurality (such as 12) of the patterns required for plates 10, thus enabling the processing to be carried on with a minimum of handling of individual plates. Referring now to Figure 5, the step of exposing the composite sheet (designated 58) of Figure 3 to a light source 60 through the master 56 is illustrated. For purposes of clarity, sheets 56 and 58 are shown as spaced apart, but ordinarily the master 56 would be in intimate contact with sheet 58 to provide a sharp delineation of the images carried by the master upon the light sensitive surfaces of the sheet 58. However, it will be apparent to those skilled in the art of photo-engraving that a projection printing, enlarging or reducing system could equally well be used. The light source 60 is illustrated only diagrammatically, and it may comprise either an incandescent light or a source rich in ultra-violet, depending upon the particular light-sensitive material with which sheet 58 is coated.

In accordance with the preferred process, after plate

58 has received a suitable exposure through the master it is washed or developed with alcohol and then with water, which operates to remove from the plate those portions of the cold top enamel which have not been exposed to light and which have, therefore, not been rendered insoluble in the alcohol and water. The plate 58 which now bears a pattern of cold top enamel covering those areas where the copper sheet 52 is to remain is now subjected to a baking operation whose object is further to set the enamel and protect the underlying metal during subsequent operations.

These subsequent operations include the step of subjecting at least the top surface of plate 58 to a solution of iron chloride which attacks and dissolves away the unprotected copper lying outside the areas covered and protected by the hardened cold top enamel, whereupon the plate is again washed with powdered pumice and water to remove the etching fluid and the remaining cold top enamel. This leaves the plate with a pattern as shown in Figure 6 in which the desired configuration of conductive material (copper) is visible as a design upon the insulating base 50.

In order to provide a durable and quiet electrical contact between the shorting fingers 16 and the metallic pattern of the plate, it is desirable to silver-plate the conductive copper pattern, and such plating also provides reduced resistance in the pattern areas which is particularly important where radio frequencies are being handled.

Since, however, in the finished plates 10 the various conductive areas are electrically distinct from one another, separate connections would have to be made to each of these distinct conductive areas of plate 58; we, therefore, temporarily interconnect all of these conductive portions by lines of metal which are afterwards open-circuited to accomplish the necessary electrical separation of the pattern areas. We prefer to accomplish this by providing a master or negative 56 which has in addition to the transparent areas desired in the final plates additional transparent lines which will produce these temporary interconnections between all of the conductive portions of the plate 58.

Figure 6:
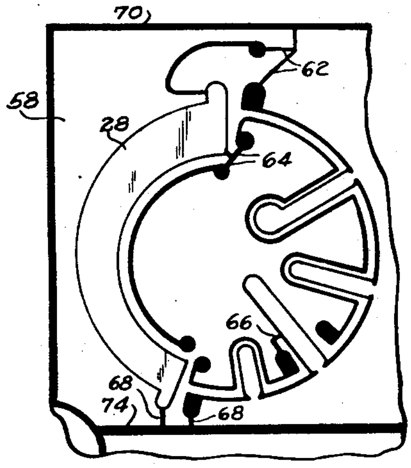
Figure 6 is a plan view of a portion of the sheet of Figure 3 after completion of the photo-etch process.
Figure 7:
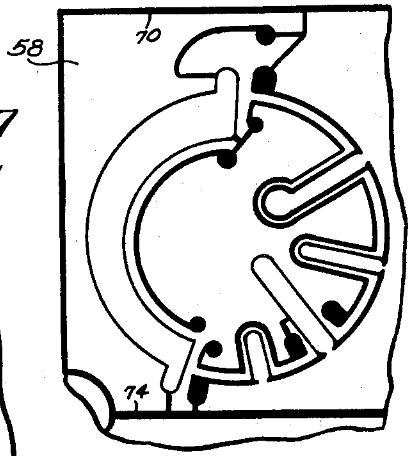
Figure 7 is a plan view of a similar portion of the sheet of Figure 3 after the metallic portions have been plated.
Figure 8:
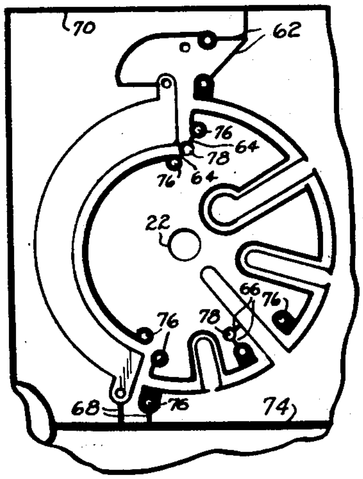
Figure 8 is a similar view of the same sheet portion after removal of undesired electrical connections.

As shown in Figure 6, these temporary interconnections are illustrated by numerals 62, 64, 66 and 68 comprising relatively narrow conductive strips which join all the conductive portions of the pattern to one another and to borderlines 70 or to a longitudinal wider strip 74 in the nature of a bus. These same temporary interconnections are illustrated in Figure 7 which represents one corner of a sheet 58 after the metallic areas have been silver-plated in a conventional electroplating bath. The areas 74 of conductive material may be utilized for the attachment of the electrodes in the plating process.

The finished multi-unit plates 58 are then pierced or perforated, for example, in a drill press or a punch press equipped with suitable punching dies to provide the apertures for the shaft (such an aperture being designated by numeral 22), the apertures 76 which are later to receive eyelets, and additional apertures 78 whose purpose is to interrupt the electrical continuity of the temporary interconnections such as those designated by numerals 64 and 66. After this piercing or punching operation, the sheets are blanked to provide the desired profile. This blanking operation (which might also be accomplished by sawing) also serves to interrupt the continuity of the other temporary interconnections 62 and 68. The unit plate which has passed through the blanking stage is shown in Figure 9, in which numeral 80 designates slots which are provided to receive locating struts serving to hold a plurality of the finished unit plates in proper face-to-face relationship.

Figure 9:
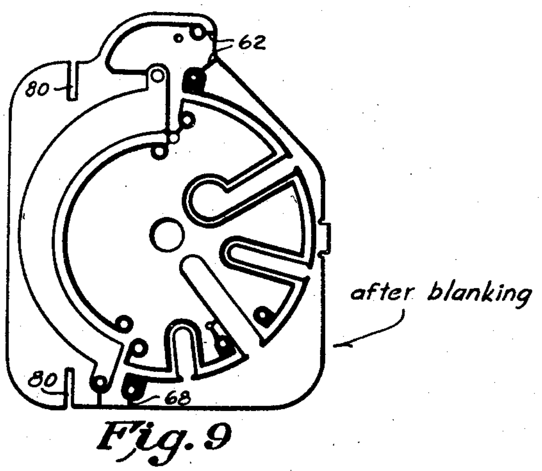
Figure 9 is a plan view of a single one of the finished elements after blanking from the sheet of Figure 3.
Figure 10:
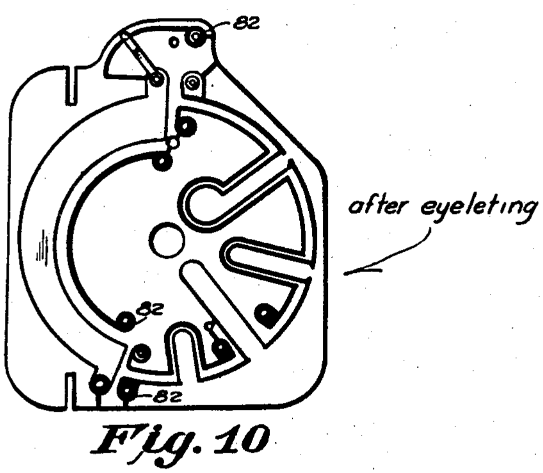
Figure 10 is a plan view of a finished unit to which connecting eyelets have been applied.

Figure 10 illustrates a unit plate of the type shown in Figure 9 after there have been secured thereto the eyelets 82 which enable external connections to be made to the individual conductive areas of such unit plate.

This invention could be modified in various non-inventive ways without departing from the spirit of our invention, and we, therefore, do not desire to be limited to the specific details described above but only by the scope of the appended claims.

We claim:

1. A tunable transmission line comprising an arcuate conductive band presenting distinct tuning positions to a first contactor slidable along the band, an auxiliary arcuate conductive strip with one end electrically connected to a terminus of said band and the other strip end constituting a terminal for the transmission line, and second slidable contactor means for short-circuiting portions of said strip for fine tuning the transmission line to predetermined effective electrical length.

2. A tunable transmission line as set forth in claim 1 in which the conductive band and strip are mounted on an insulation sheet with the strip extending beyond the band terminus.

3. A tunable transmission line as set forth in claim 2 in which the strip short-circuiting means includes a spring contact finger slidable along the arcuate strip.

4. A tunable transmission line as set forth in claim 2 in which the arcuate conductive band is tapered along its width.

References Cited in the file of this patent

UNITED STATES PATENTS

| | | |
|---|---|---|
| 885,782 | Packard | Apr. 28, 1908 |
| 2,388,534 | Frazier | Nov. 6, 1945 |
| 2,441,960 | Eisler | May 25, 1948 |
| 2,513,392 | Aust | July 4, 1950 |
| 2,513,393 | Frey et al. | July 4, 1950 |
| 2,627,579 | Wasmansdorff | Feb. 3, 1953 |
| 2,657,362 | Epperson | Oct. 27, 1953 |
| 2,734,175 | Wasmansdorff | Feb. 7, 1956 |

FOREIGN PATENTS

| | | |
|---|---|---|
| 570,877 | Great Britain | July 26, 1945 |